(No Model.) 2 Sheets—Sheet 1.

J. O. BARTHOLOMEW.
MACHINE FOR CUTTING COCOANUT MEAT.

No. 384,414. Patented June 12, 1888.

Joel O. Bartholomew, Inventor
By Atty.

Witnesses,

N. PETERS, Photo-Lithographer, Washington, D. C.

(No Model.) 2 Sheets—Sheet 2.
J. O. BARTHOLOMEW.
MACHINE FOR CUTTING COCOANUT MEAT.
No. 384,414. Patented June 12, 1888.
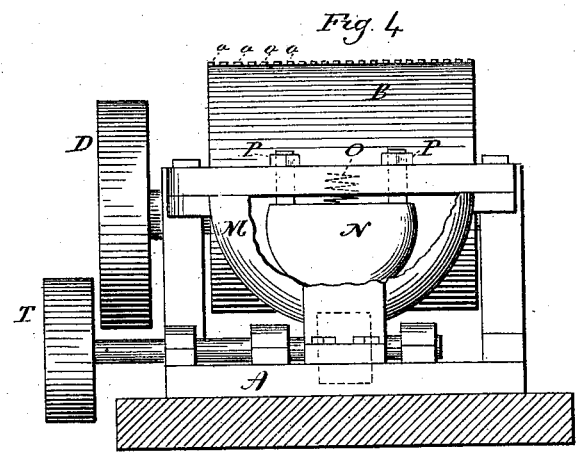
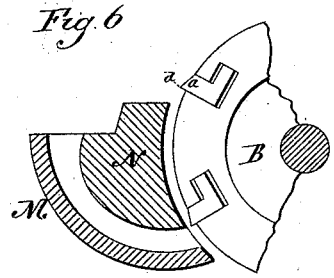
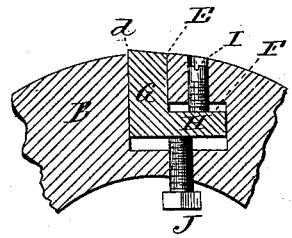
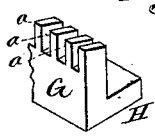
Witnesses
J. H. Shumway
Fred C. Earl
Joel O. Bartholomew
Inventor
By Atty.

UNITED STATES PATENT OFFICE.

JOEL ORRIN BARTHOLOMEW, OF NEW HAVEN, CONNECTICUT, ASSIGNOR OF ONE-HALF TO BENAJAH H. DOUGLASS, JR., OF SAME PLACE.

MACHINE FOR CUTTING COCOANUT-MEAT.

SPECIFICATION forming part of Letters Patent No. 384,414, dated June 12, 1888.

Application filed March 8, 1888. Serial No. 266,549. (No model.)

*To all whom it may concern:*

Be it known that I, JOEL ORRIN BARTHOLOMEW, of New Haven, in the county of New Haven and State of Connecticut, have invented a new Improvement in Machines for Cutting Cocoanut-Meat; and I do hereby declare the following, when taken in connection with accompanying drawings and the letters of reference marked thereon, to be a full, clear, and exact description of the same, and which said drawings constitute part of this specification, and represent, in—

Figure 1:
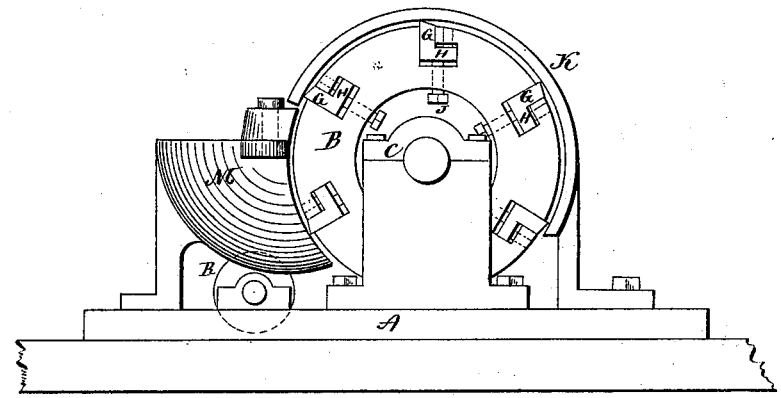
Figure 2:
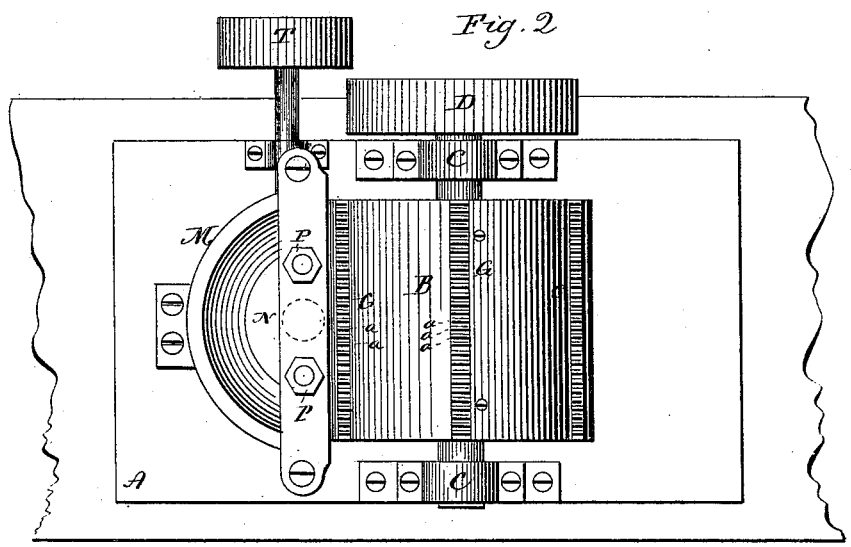
Figure 3:
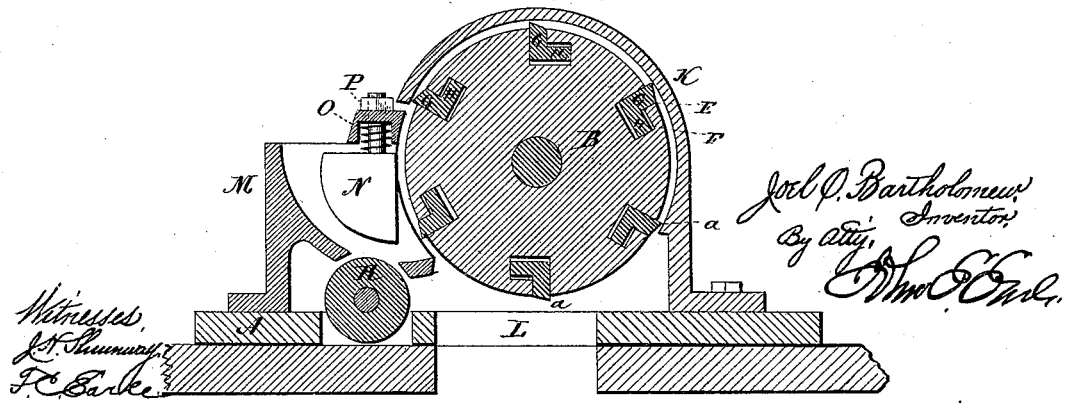

Figure 1, a side view of the machine complete; Fig. 2, a top view of the same with the bonnet removed; Fig. 3, a vertical central section; Fig. 4, an end view of the machine, looking toward the hopper; Fig. 5, an enlarged section of the cylinder illustrating the means for adjusting the cutter-bars; Fig. 6, a vertical section illustrating the follower as stationary and without automatic feed; Fig. 7, a perspective view of a portion of one of the cutter-bars enlarged.

This invention relates to a machine for cutting cocoanut-meat, as for pastry and confectionery uses, the object being the construction of a cutter which will work uniformly and rapidly; and the invention consists in a cylinder constructed with one or more longitudinal grooves in its periphery, combined with bars arranged in said grooves, so that the edge of the bars may project from the periphery of the cylinder, the said projecting edge serrated to present a series of cutting-teeth, and the said bars made adjustable in said cylinder to increase or diminish the projection of the said serrated edge of the bars, with a hopper opening against the periphery of the said cylinder, and through which the pieces of meat of the cocoanut are fed to the cutter-bars in said cylinder, as more fully hereinafter described.

A represents the base or bed of the machine; B, the cutter-cylinder, which is supported in bearings C on the bed, and so that rapid revolution may be imparted to said cylinder through a pulley, D, or otherwise. Preferably the axis of the cylinder is horizontal. The cylinder is constructed with one or more longitudinal grooves, E, across its periphery, the said grooves opening from the periphery outward, and at the bottom the grooves are turned at substantially right angles, as at F, so as to form grooves of substantially L shape in transverse section, as seen in Figs. 3 and 5. While one groove will answer a very good purpose, I prefer several, as shown, the illustration representing six such grooves. Into each of these grooves the cutter-bar G is set. This cutter-bar in width corresponds to the width of the groove through the periphery, and the bar is made of L shape in transverse section, corresponding to the shape of the groove, except that the laterally-turned portion H of the bar is less in thickness than the depth of that portion F of the groove in the cylinder, so that the bar G may be moved radially to produce a greater or less extent of projection of the bar from the surface of the cylinder, and it is thus made adjustable by means of set-screws I J in the cylinder, the screws acting opposite each other, so that the bar may be adjusted and firmly set in the cylinder. The edge of the bar is serrated or notched, as seen in Fig. 7, to form a series of cutters, *a*, on the edge of the bar. These cutters are best made by cutting notches of a width substantially equal to the width between the notches, and so as to form a series of teeth equal in width to the spaces between them. The outer surface of the bar is beveled backward, so as to form a cutting-edge, as indicated at *d*, Fig. 5, projecting from the surface of the cylinder. These teeth on the edges of the bar form the cutters to operate upon the cocoanut-meat. The cylinder is inclosed by a bonnet, K, but with an opening, L, through the bed below, as seen in Fig. 3, for the discharge of the meat which may be cut.

Upon one side of the case a hopper, M, is arranged. This is best made in the form of a segment of a sphere, the concave side up, and opening directly onto the surface of the cylinder, the inner edge of the hopper conforming to the shape of the cylinder, as represented in Fig. 3, and so that the said hopper forms a support in which the meat may be held in contact with the cylinder. This spherical shape of the hopper is preferred, because it conforms substantially to the shape of the portions of meat which are to be fed to the cutters. Within the hopper a spring-follower, N, is arranged, the surface of which corresponds substantially to the inner surface of the hopper, but so as to leave a space between the follower and the hopper, as seen in Fig. 3, through which the meat may be forced to the cylinder. This follower is provided with one or more springs, O, which will yield to varying thicknesses of meat, and, preferably, the follower is also made adjustable by means of adjusting-nuts P; but the follower may be made stationary. (Represented in Fig. 6.)

The space between the follower and the hopper should expand at the top, as seen in Figs. 3 and 6, for the convenience of introduction of the meat.

As a feeding device to automatically force the meat against the cylindrical cutters, a feed-roll, R, is introduced below the hopper, which works through an opening in the bottom of the hopper, so as to engage the meat in the hopper and force it toward the cylinder, it being understood that power is applied to impart revolution to this feed-roller, as through a pulley, T, or otherwise; but the feed-roller may be omitted, as represented in Fig. 6, and the pieces of meat successively fed into the hopper by hand, the pieces so fed, being pressed downward by hand, follow each other forcibly against the cylinder, and as the meat is presented through the hopper to the cylinder the cutters come in contact with the meat and cut therefrom narrow strips corresponding to the width and projection of the cutters or surface of the cylinder. The thickness of the cut is adjustable by means of set-screws I J, before referred to.

The cuttings from the meat are discharged through the opening below into a suitable receiver.

Under this construction the meat is easily fed to the cutters, and the work of the cutters is very rapid.

In the use of the machine there is no liability to injury of the attendant, as the peculiar construction of the hopper prevents the possibility of bringing his hands into contact with the cutters.

The cutter-bars are readily removable from the cylinder for the purpose of sharpening or for renewal, or to interchange with bars of different grades of cut.

I do not wish to be understood as claiming, broadly, a cylinder having longitudinal bars arranged in grooves in its periphery and presenting notched edges projecting beyond the face of the cylinder, as such I am aware is not new.

I claim—

1. In a machine for cutting cocoanut-meat, the combination of a revolving cylinder constructed with one or more longitudinal grooves in its periphery, a longitudinal bar arranged in each of said grooves, with its edge projecting from the periphery of the cylinder, the said projecting edge notched to form a series of cutters, and the said bar made adjustable with relation to the periphery of the cylinder, with a hopper opening against said cylinder, the edge of the hopper around the opening conforming to the shape of the cylinder and adapted to receive the cocoanut-meat and support the meat in contact with the face of the said cylinder, substantially as described.

2. The combination of the revolving cylinder B, constructed with one or more longitudinal grooves in its periphery, the said grooves of L shape in transverse section, with longitudinal bars arranged in said grooves of corresponding L shape, the edge of said bars projecting from the periphery and notched to form a series of cutters, adjusting-screws for said bars, and a hopper of concave shape opening to said cylinder, with a follower in said hopper and corresponding to its interior shape, but of less diameter, so as to leave a space between the follower and the hopper, substantially as described.

3. The combination of the revolving cylinder B, constructed with one or more longitudinal grooves in its periphery, a bar arranged in each of said grooves, the projecting edge of said bar notched to form a series of cutters on the periphery of the cylinder, and the said bars made radially adjustable, with a hopper, M, of concave shape upon its inside, opening to the periphery of said cylinder, and an adjustable follower, N, within said cylinder, its surface convex corresponding to the inner surface of the hopper, but of less diameter, the said follower provided with springs whereby it is yieldingly adjustable with relation to the inner surface of said hopper, substantially as described.

4. The combination of the cylinder B, constructed with one or more longitudinal grooves in its periphery, longitudinal bars G in said grooves made radially adjustable, the projecting edge of said bars notched to form a series of cutters, and a hopper, M, its inner surface of concave shape, opening toward the cylinder, a spring-follower, N, in said hopper and of corresponding shape, with a feed-roll in an opening through the hopper below the follower, substantially as described.

JOEL ORRIN BARTHOLOMEW.

Witnesses:
B. H. DOUGLASS, Jr.,
FRED C. EARLE.